(12) United States Patent
Martins et al.

(10) Patent No.: US 8,264,378 B1
(45) Date of Patent: Sep. 11, 2012

(54) AIRCRAFT DISPLAY CENTER AND RANGE CONTROL

(75) Inventors: Jill M. Martins, Lynnwood, WA (US); Samuel T. Clark, Federal Way, WA (US); Juliana J. Goh, Kirkland, WA (US); Roglenda R. Bowe, Maple Valley, WA (US)

(73) Assignee: The Boeing Company, Chicago, IL (US)

( * ) Notice: Subject to any disclaimer, the term of this patent is extended or adjusted under 35 U.S.C. 154(b) by 373 days.

(21) Appl. No.: 12/561,662

(22) Filed: Sep. 17, 2009

(51) Int. Cl.
*G01C 21/00* (2006.01)

(52) U.S. Cl. ........ 340/979; 340/971; 340/972; 340/684; 340/961

(58) Field of Classification Search .................. 340/979, 340/971, 972, 684, 961; 701/120, 208, 211, 701/225
See application file for complete search history.

(56) References Cited

U.S. PATENT DOCUMENTS

| | | | |
|---|---|---|---|
| 2006/0005147 A1* | 1/2006 | Hammack et al. | 715/805 |
| 2008/0106438 A1 | 5/2008 | Clark et al. | |
| 2008/0163093 A1* | 7/2008 | Lorido | 715/771 |

OTHER PUBLICATIONS

U.S. Appl. No. 11/939,806 entitled "Multi-Function Switches for a Display" filed Nov. 14, 2007.

\* cited by examiner

*Primary Examiner* — Tai T Nguyen
(74) *Attorney, Agent, or Firm* — Hope Baldauff Hartman, LLC

(57) ABSTRACT

Technologies are described herein for providing enhanced center and range control on an aircraft display. According to embodiments, a display mode is selected to display a map on the aircraft display. A range input for displaying the map in the selected display mode at a desired range and a centering input for centering on a predefined map location on the aircraft display are received. The range input and the centering input associated with the selected display mode are then stored. When the selected display mode is deselected and then reselected, the map is displayed on the aircraft display in the selected display mode according to at least one of the stored range input and the centering input associated with the selected display mode.

20 Claims, 16 Drawing Sheets

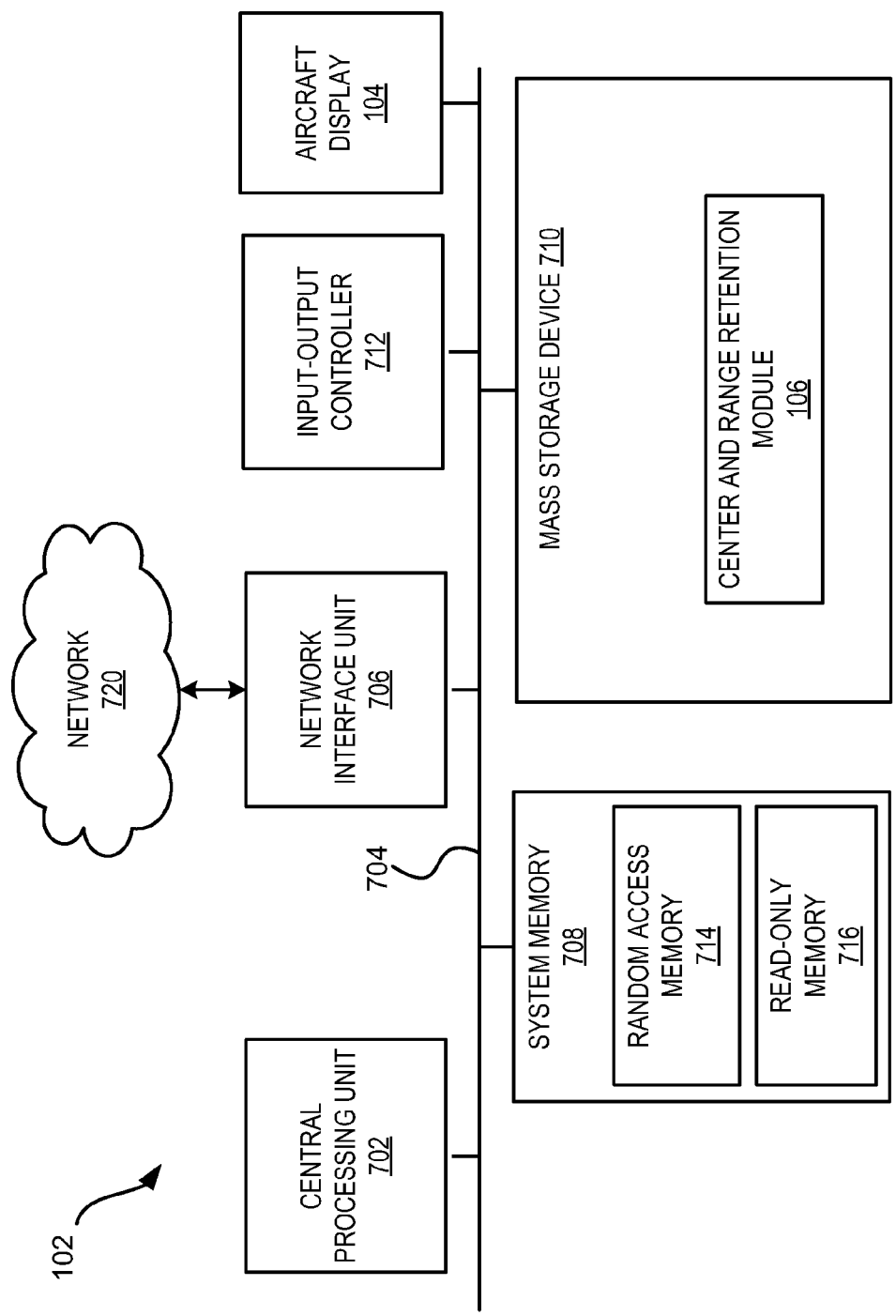

AIRCRAFT DISPLAY CENTER AND RANGE CONTROL

FIELD OF THE DISCLOSURE

The present disclosure relates generally to avionics and navigation systems, and in particular to centering and range control functions associated with aircraft displays.

BACKGROUND

Conventional commercial aircraft often utilize an Electronic Flight Information System (EFIS) control panel to control the information that is provided on a display located in the cockpit of the aircraft. Pilots routinely utilize various display modes offered by the EFIS control panel and the display for tactical and strategic planning For example, pilots often use a MAP display mode as a tactical tool for navigation awareness and decision-making. In this display mode, a map is oriented track-up or heading-up, and the ownship position indicator is fixed on the display, such that the map translates and rotates in reference to ownship. However, the MAP display mode typically cannot be randomly panned, offset, or shifted. Predefined MAP display shifting is usually limited to a center and expanded view.

Alternatively, pilots may use a PLN display mode as a strategic tool for, route planning, awareness, and decision-making for current and future phases of flight. In the PLN display mode, the map is oriented north-up, and the ownship position indicator translates and rotates, while the displayed map is fixed, and does not rotate or translate. Centering and range control limitations may make the use of the MAP and PLN display modes difficult or inefficient. In current display systems, when a display mode (MAP or PLN) is selected, the display defaults to the last range selected on the EFIS control panel.

In addition, the centering defaults to an ownship-centered position, which is not necessarily the last centered position of the selected display mode. Thus, if a center and range setting is selected for display in the PLN display mode, and the display is switched to the MAP display mode and the center and range settings are adjusted, the display does not retain the center and range settings last selected on the PLN display mode when the PLN display mode is reselected. Instead, the display defaults to a centered ownship and the last range selected on the MAP mode or the current EFIS range setting. As a result, the desired center and range settings must be reselected if a pilot wishes to go back and forth between MAP and the PLN display modes with different center and range settings. Such reselections require multiple pilot inputs which increase pilot workload and reduce efficiency.

It is with respect to these and other considerations that the disclosure made herein is presented.

SUMMARY

Strategies are described herein for providing enhanced centering and range control on an aircraft display. By utilizing these strategies, a pilot can switch between different display modes, each retaining different centering locations and range settings, which reduces display interface effort and increases efficiency.

According to one aspect of the disclosure, a display mode is selected to display a map on the aircraft display. A range input for displaying the map in the selected display mode at a desired range, and a centering input for centering a predefined location in the map on the aircraft display are received. The range input and the centering input associated with the selected display mode are then stored. When the selected display mode is deselected and then reselected, the map is provided in the selected display mode according to at least one of the stored range input and the centering input associated with the selected display mode.

In another aspect of the present disclosure, a system for providing enhanced center and range control on an aircraft display includes a computer storage medium for centering map locations on the aircraft display. The map locations include a map location of the aircraft, a map location aligned with the heading of the aircraft and a map location not aligned with the location or heading of the aircraft. The system also includes a control panel that receives an input for selecting a display mode for displaying a map on the aircraft display in either a MAP display mode or a PLN display mode. The control panel also receives a centering input for centering on a predefined map location on the aircraft display. The system also includes an aircraft display that displays the map in the selected display mode with the predefined location in the map at a center of the aircraft display.

In yet another aspect, a control panel includes a display mode selector switch that receives a selection for displaying a map on the aircraft display in either a MAP display mode or a PLN display mode. A centering switch receives a centering input to center on a selected predefined map location on the aircraft display and a range switch receives a range input to display the map on the aircraft display at the desired range. A display management system receives inputs from the control panel and stores the received centering input and the range input associated with the selected display mode. The aircraft display displays the map in the selected display mode at the desired range and with the selected predefined map location at a center of the aircraft display.

It should be appreciated that the above-described subject matter may be implemented in various embodiments without departing from the spirit of the disclosure. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIG. 7 is a block diagram showing an illustrative computer hardware and software architecture for a computing system capable of implementing aspects of the embodiments presented herein.

DETAILED DESCRIPTION

Figure 1:
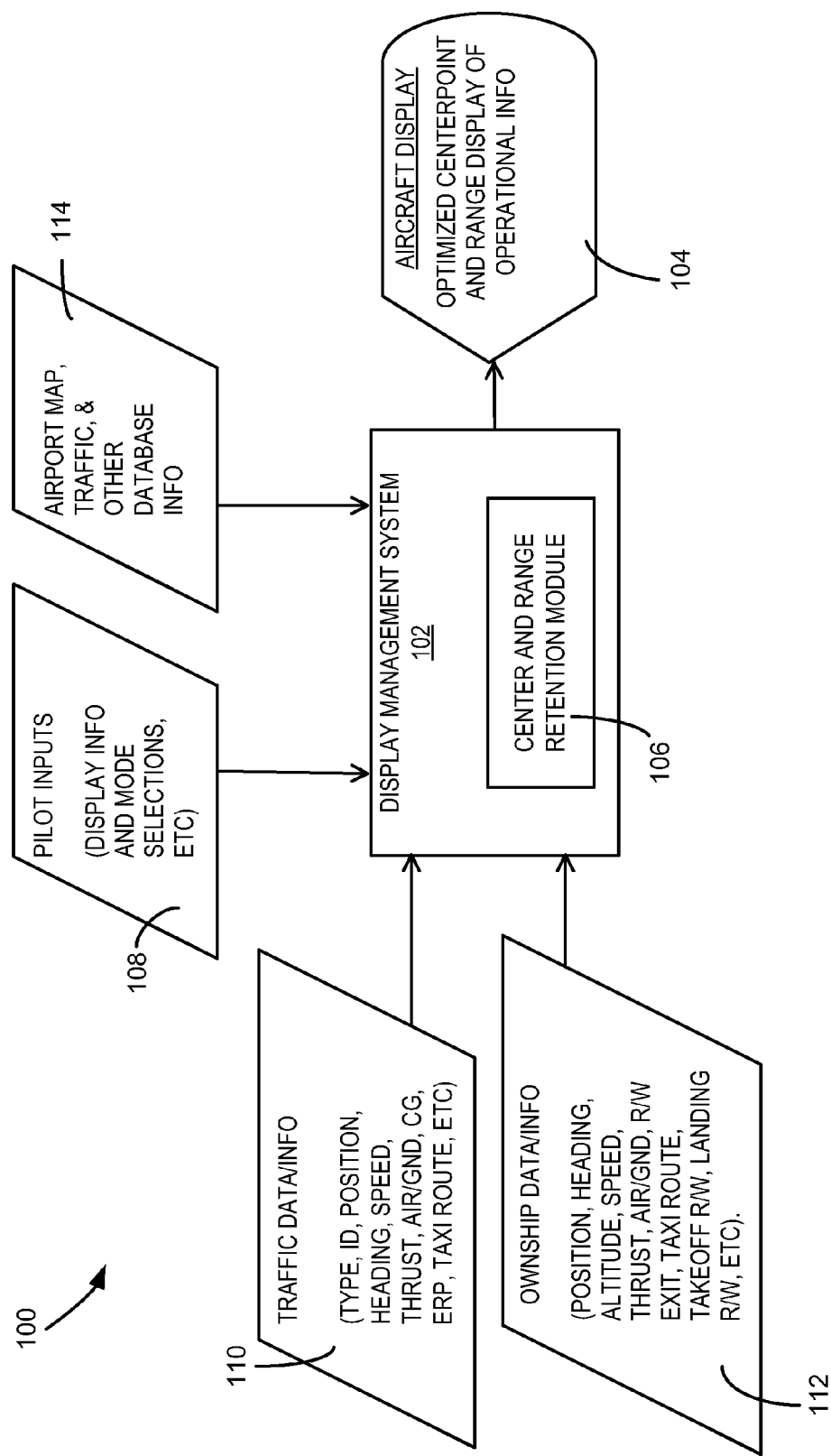
FIG. 1 is a display data architecture diagram showing various data inputs corresponding to a display management system of an aircraft, according to embodiments presented herein.

The following detailed description is directed to technologies for providing enhanced centering and range control on an aircraft display. In the following detailed description, references are made to the accompanying drawings that form a part hereof and that show, by way of illustration, specific embodiments or examples. In the drawings, like numerals represent like elements through the several figures.

FIG. 1 is a display data architecture diagram 100 showing input to a display management system 102 and resulting output to an aircraft display 104, in accordance with embodiments of the present disclosure. The display management system 102 includes a processor, various algorithms and modules for performing the various operations described below, including modules for displaying maps containing navigation information according to various display modes on the aircraft display 104. According to the disclosure provided herein, the display management system 102 may include one or more computers or computer system components, which will be described in greater detail below with regard to FIG. 7.

The aircraft display 104 is configured to display a map containing navigation information in various display modes. At present, the aircraft display 104 may display navigation maps in the MAP display mode or the PLN display mode. As described above, the MAP display mode displays a map oriented track-up or heading-up with an ownship position indicator indicating the position of the ownship being fixed on the aircraft display, while the PLN display mode displays a map oriented north-up with the ownship position indicator being translated and rotated on the aircraft display while the displayed map is fixed on the aircraft display.

For clarity purposes, the various embodiments described below have been described with respect to a navigational map being presented on the aircraft display 104 and manipulated according to the various strategies described below. However, it should be understood that the disclosure provided herein is not limited to the display of a map, and is equally applicable to any information rendered on a display in which the described strategies would be desirable.

Returning to FIG. 1, the display management system 102 receives input corresponding to various types of flight information that may be relevant to the aircraft for navigation purposes. According to various embodiments, the display management system 102 receives pilot inputs 108, traffic data/information 110, ownship data/information 112, and airport map data information 114 from respective modules and/or aircraft subsystems and then processes the collective data to display graphical representations on the aircraft display 104 indicating various information provided by the respective modules. These inputs may be used to automatically control the display centering or range control strategies.

According to embodiments, the display management system 102 includes a center and range retention module 106 that may provide a pilot with enhanced center and range control capabilities on the aircraft display 104. The center and range retention module 106 may be implemented as software or hardware capable of retaining desired center and range settings for various display modes of the aircraft display 104 of an aircraft. The center and range retention module 106 may allow a pilot to interact with the aircraft display 104 by means of a control panel for utilizing the PLN display mode on the aircraft display 104 for strategic and tactical planning purposes. What this means is that the pilot will be able to efficiently center in on locations, such as particular points of interest and locations in the map already defined in the center and range retention module 106 and control the range at which the map is being displayed on the aircraft display 104. In addition, the pilot may also be able to switch between the PLN display mode and the MAP display mode without having to re-enter the desired center and range settings for that display mode each time the pilot switches between the PLN display mode and the MAP display mode.

Figure 2:
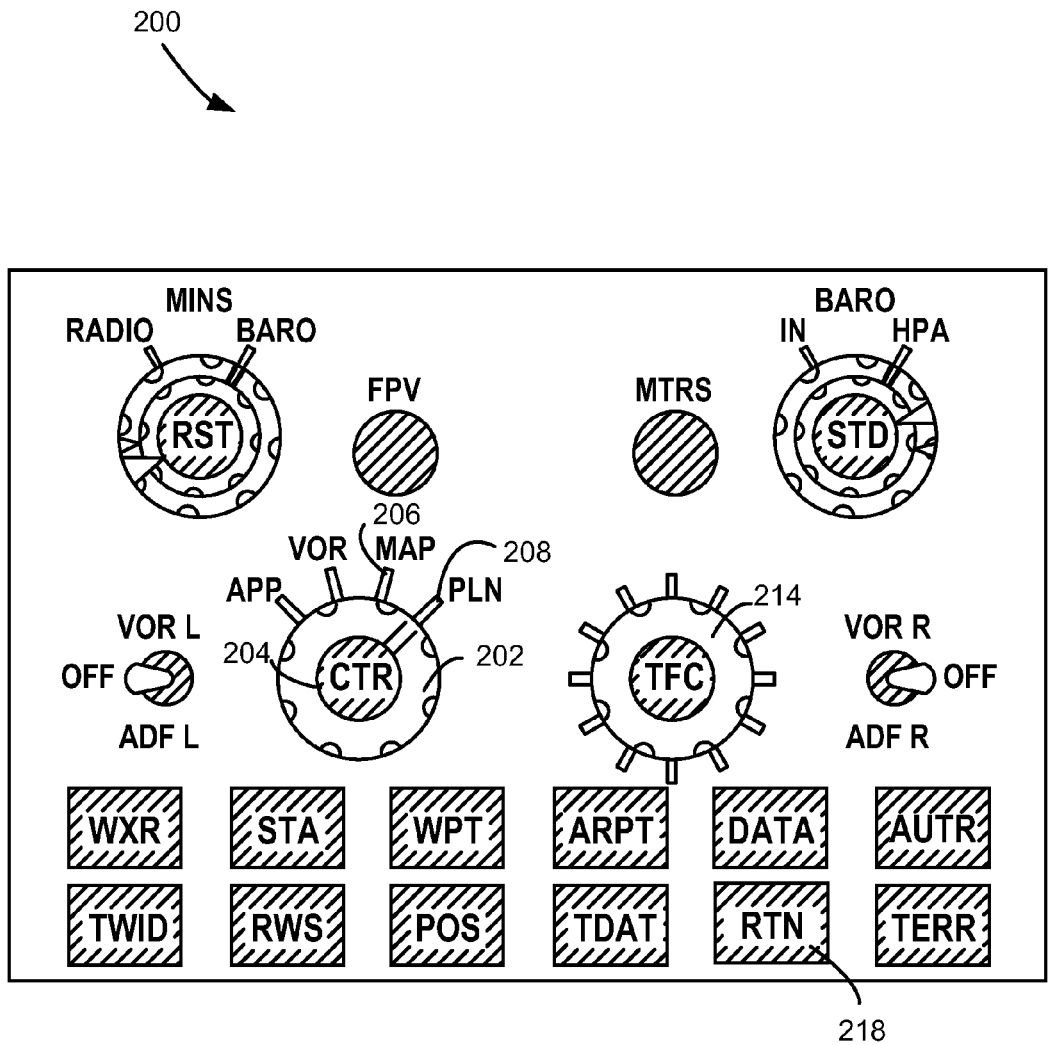
FIG. 2 is a front view of an exemplary Electronic Flight Information System (EFIS) control panel for use with an aircraft display, according to embodiments presented herein.

Referring now to FIG. 2, a front view of an exemplary EFIS control panel 200 is shown. The EFIS control panel 200 may include a plurality of two state and multi-state push button switches and rotary switches that may be utilized to control the activation of functions and the display of information on the aircraft display 104. According to the present embodiment, the EFIS control panel 200 may be configured to receive a range input for controlling the range at which the map is displayed on the aircraft display 104 and a centering input for centering a predefined map location on the aircraft display. The EFIS control panel 200 may include an aircraft display mode selector 202 for receiving a display mode selection input to allow a pilot to select the MAP display mode, the PLN display mode or any other alternative display modes for display on the aircraft display 104. According to embodiments, the aircraft display mode selector 202 may be a rotary switch that includes a MAP position 206 for selecting the MAP display mode, and a PLN position 208 for selecting the PLN display mode. Alternate display modes may be selected by rotating the aircraft display mode selector 202 to the specific alternate display mode that may be defined on the EFIS control panel 200. When the aircraft display mode selector 202 is at the MAP position 206, route and map information, airplane position, heading and track information is displayed on the aircraft display 104 in the MAP display mode. When the aircraft display mode selector 202 is at the PLN position 208, the aircraft display 104 displays the map and all relevant and desired information in the PLN display mode. In all modes, an ownship position indicator may be displayed that represents the ownship position and orientation. In alternative embodiments, display mode selection may be display based, and selection may be by panel switch, cursor, or touch display.

The EFIS control panel 200 may also include a CTR switch 204 for receiving the centering input from a pilot for selecting a predefined map location that is to be centered on the aircraft display 104. A predefined map location may be any location in the map, which may be previously stored by the display management system 102, such that a pilot may center on the predefined map location on the aircraft display. Further, a predefined map location may include any map location that is manually defined by a pilot through a pilot input. It should be appreciated that the predefined map location may be a location that is defined by a geographical landmark or location on the ground, a location that is a specific distance away from the ownship, a geographical landmark, or a location that may be a specific distance away from the ownship on the aircraft display. In alternative embodiments, center selection may be display based, and selection may be by panel switch, cursor, or touch display.

In the MAP display mode, the ownship is either centered or offset to near the bottom of the display on the map. However, according to embodiments, in the PLN display mode, any map location may be centered on the aircraft display 104 as long as it is predefined in the display management system 102. In various embodiments, the predefined map location may include any map location that is manually defined by a pilot through a pilot input. The CTR switch 204 may be a momentary push button, which upon being pressed may center on a predefined map location on the aircraft display 104. Subsequent presses of the CTR switch 204 by the pilot may allow the pilot to cycle through various different predefined map locations and center them on the aircraft display 104. In alternative embodiments, cursor, touch and other input devices may be used to define random centerpoints.

The EFIS control panel 200 further includes a range selector 214, which is a rotary switch that is used to receive the range input from the pilot so that the pilot may manually select the desired aircraft display nautical mile range scale. The range selector 214 may be configured to operate in both the PLN display mode and the MAP display mode. The range selector 214 may toggle between various positions by rotating the range selector 214 in a clockwise or counter-clockwise direction. As shown in FIG. 2, the various positions of the range selector 214 are intentionally unmarked because of the retention capabilities of the center and range retention module 106. As the center and range retention module 106 is capable of retaining previously stored range selections for each display mode, when a pilot switches between display modes, the range setting displayed on the aircraft display may change but the range setting selected by the range selector 214 does not. The range selector 214 is not configured to move to a different range setting each time the aircraft display displays a different range setting. Therefore, to avoid any confusion caused by the inconsistency in the range setting displayed on the aircraft display 104 and the range setting marked on the range selector 214, there are no range setting markings on the range selector 214. In an alternative embodiment, a range selector switch with marked settings may be used. In which case it is thus accepted that the displayed and selected range may temporarily disagree.

In addition, the EFIS control panel 200 may also include a retention (RTN) switch 218 that may be activated to allow the center and range retention module 106 to retain the last displayed settings of the MAP display mode and the PLN display mode, such that when the retention switch is activated, if the display mode of the aircraft display 104 switches from the MAP display mode to the PLN display mode and back to the MAP display mode, the MAP display mode is displayed on the aircraft display 104 with the last displayed center and range settings for the MAP display mode. The RTN switch 218 may be an existing switch on the EFIS control panel 200 or a new switch added to the EFIS control panel 200. The EFIS control panel 200 may also include a plurality of switches that may be configured to provide or remove additional aircraft display 104 information on the aircraft display 104, Conversely, the display range and center retention may be deactivated by deselecting the RTN switch 218.

According to embodiments, the center and range retention module 106 may implement different centering strategies to provide the pilot an efficient approach to centering various predefined map locations on the aircraft display 104. A centering strategy may be a sequence of predefined map locations that are centered on the aircraft display 104 upon subsequent presses of the CTR switch 204. In alternate embodiments, other centering switches may be used to cycle through the various predefined map locations of a particular centering strategy. The center and range retention module 106 may implement a specific centering strategy that may be selected manually through a pilot input or selected automatically based on various factors including the phase of the flight, the location of the aircraft and the speed of the aircraft. According to embodiments, a multi-state pushbutton switch or a rotary switch on the EFIS control panel 200 may be programmed to select a desired centering strategy from a variety of centering strategy options stored by the display management system 102 or to select an automatic centering strategy mode. Upon selecting a particular centering strategy for implementation using a designated switch, an aircraft display 104 may sequentially display the various predefined map locations upon the CTR switch 204 being repeatedly pressed by the pilot. In one embodiment, the various predefined map locations may be displayed on the aircraft display 104 without any pilot input.

The present disclosure describes a few of the various centering strategies that may be implemented by the center and range retention module 106. For instance, a landing centering strategy may be selected during landing to assist the pilot to focus on predefined map locations, such as runways, runway exits, subsequent runways, alternative runway crossings, and taxiing locations amongst others. It should be appreciated by those skilled in the art that implementing various centering strategies in the aircraft display 104 may provide a pilot with useful information that may not have been easily accessible before.

FIGS. 3A-3G illustrate various aircraft display images 300A-300G associated with various centering strategies that may be implemented in the PLN display mode, according to embodiments. It should be appreciated that the aircraft display images may be displayed on any aircraft display 104, including but not limited to the navigation display, the control display unit and the electronic flight bag of an aircraft. However, in various embodiments, the aircraft display 104 may be the navigation display of the aircraft and the aircraft display images described herein are display images that appear on the navigation display of the aircraft.

The various aircraft display images 300A-300G display specific information pertaining to the present location of the aircraft, such as the ownship position indicator 302 for indicating the position and heading of the ownship. In addition, the aircraft display images 300A-300G also display various other indicators that indicate the current settings of the EFIS control panel 200. For instance, a display mode indicator 306 indicates what display mode the aircraft display image is currently being displayed in, such as the MAP display mode or the PLN display mode. A range indicator 308 located near the top right corner of the aircraft display 104 indicates at what range the aircraft display image is currently being displayed. Other indicators, such as indicators for runways, air control towers, and other geographical landmarks may be displayed using various symbols on the aircraft display 104 as well. For the sake of simplicity, FIGS. 3A-3G are all aircraft display images in the PLN display mode, and the aircraft display images only differ from one another based on the location of the ownship position indicator and the map being displayed, while other features and functions displayed on the aircraft display images remain unchanged. The range scale is set to 1.00 nm as indicated by the range indicator 308 on the aircraft display 104 and the display mode indicator 306 indicates that the aircraft display image is in the PLN display mode.

Figure 3A:
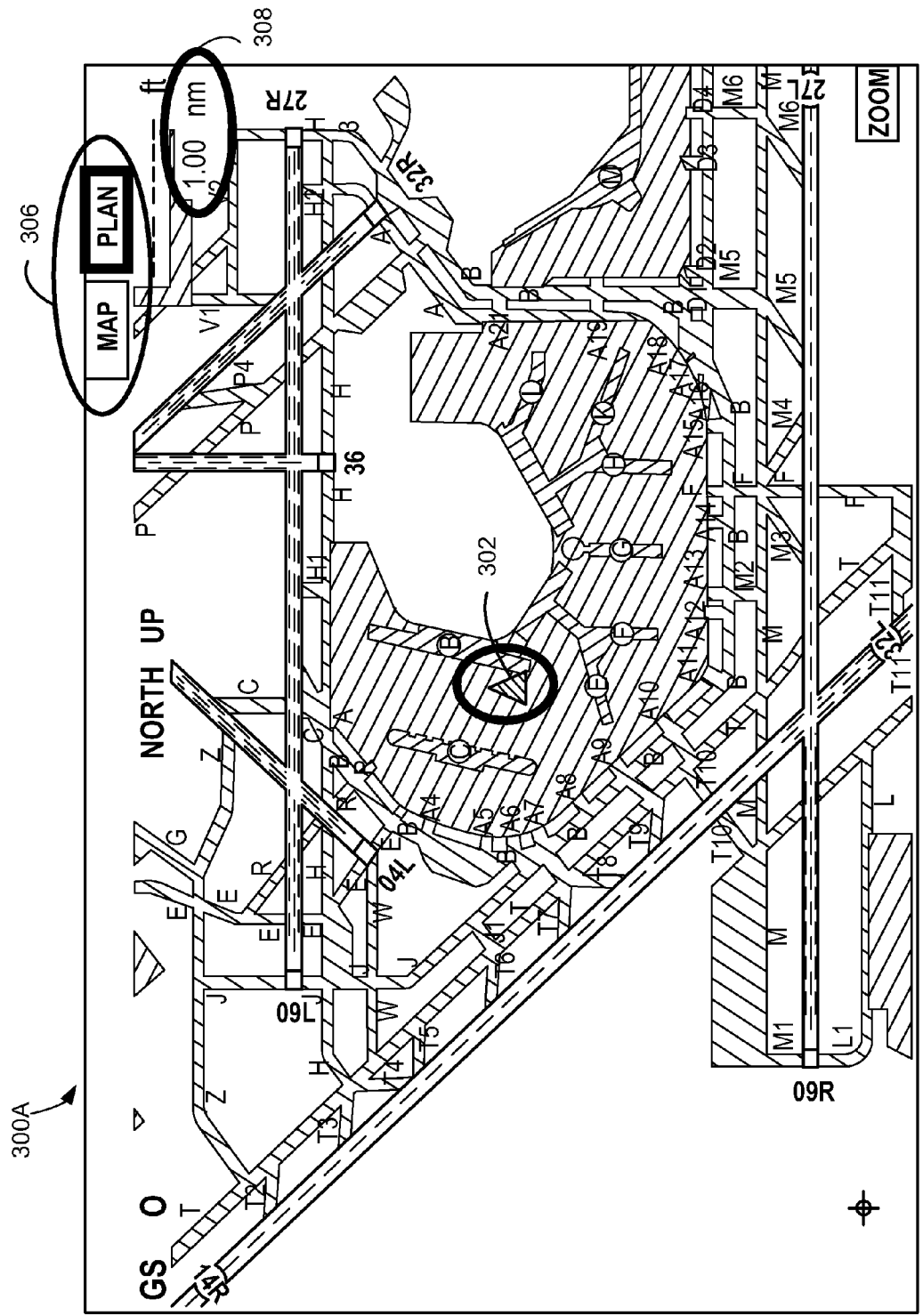
FIGS. 3A-3G are aircraft display images associated with various centering strategies implemented in the PLN display mode of the aircraft display, according to embodiments presented herein.
Figure 3B:
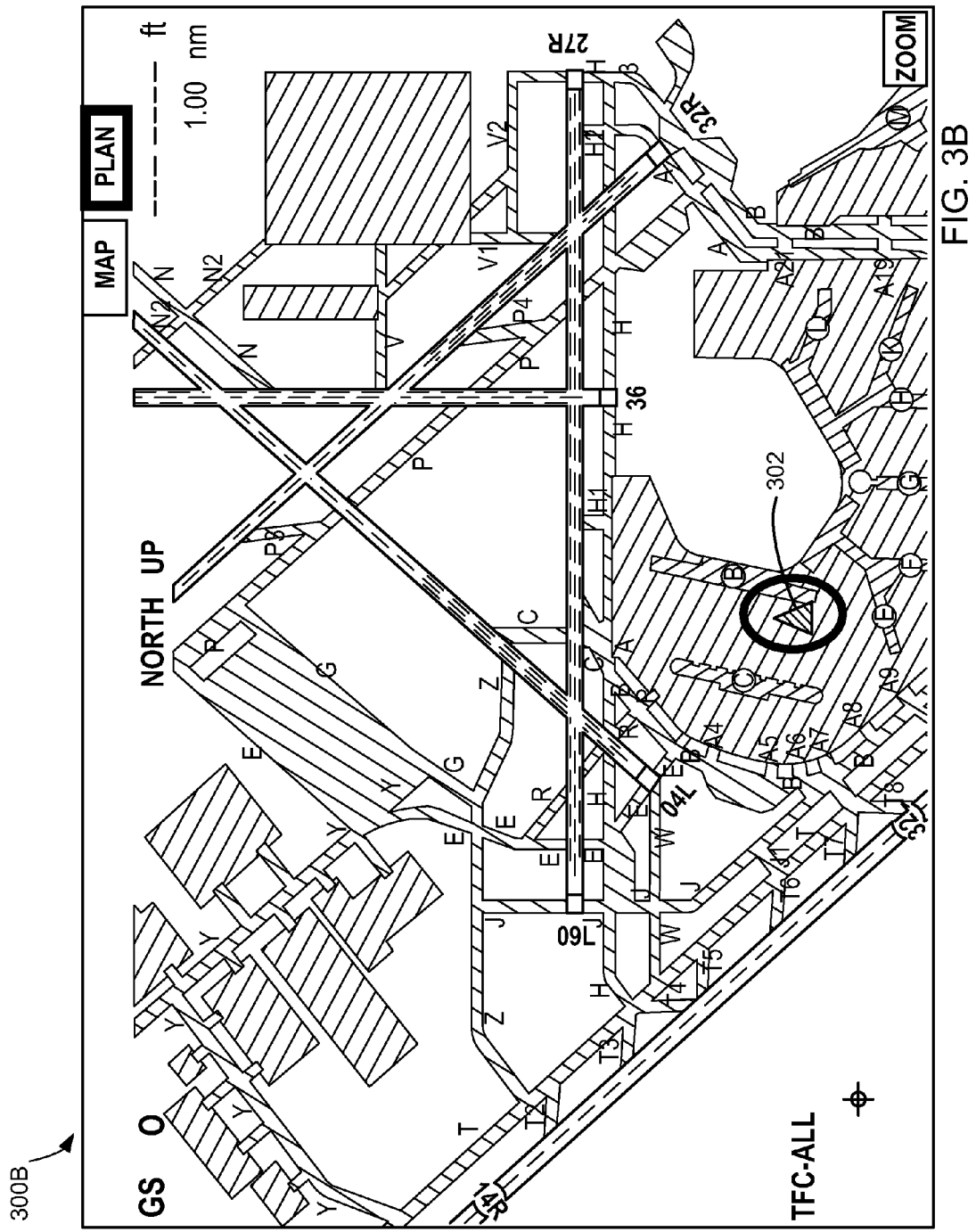

Various centering strategies that may be implemented by the center and range retention module 106 will now be described in context to the FIGS. 3A-3G. Referring specifically to FIGS. 3A and 3B, the implementation of a north-shift centering strategy is shown on the aircraft display 104 in the form of an aircraft display image 300A and an aircraft display image 300B. In aircraft display image 300A, the ownship position indicator 302 is located at the center of the aircraft display 104 and indicates that the ownship is headed in the North direction. Upon pressing the CTR switch 204, the aircraft display 104 displays aircraft display image 300B, where the ownship position indicator 302 is now positioned towards the bottom of the aircraft display 104, and a predefined map location north of the aircraft is displayed at the center of the aircraft display 104. The predefined map location north of the aircraft may be a location at the top edge of the aircraft display image 300A or may be another predefined map location north of the aircraft.

In various embodiments, the north-shift centering strategy may involve one predefined map location north of the aircraft, such that the center of the aircraft display may alternate between the ownship position indicator 302 and the predefined map location north of the aircraft. Alternatively, in embodiments where the north-shift centering strategy involves more than one predefined map location north of the aircraft, the center of the aircraft display may cycle through two or more predefined map locations north of the aircraft before recentering on the ownship position indicator. It should be appreciated that implementing the north-shift centering strategy allows the pilot to observe the surrounding areas of the predefined map location north of the ownship that may not have previously been displayed when the ownship position indicator 302 was centered on the aircraft display 104.

Figure 3C:
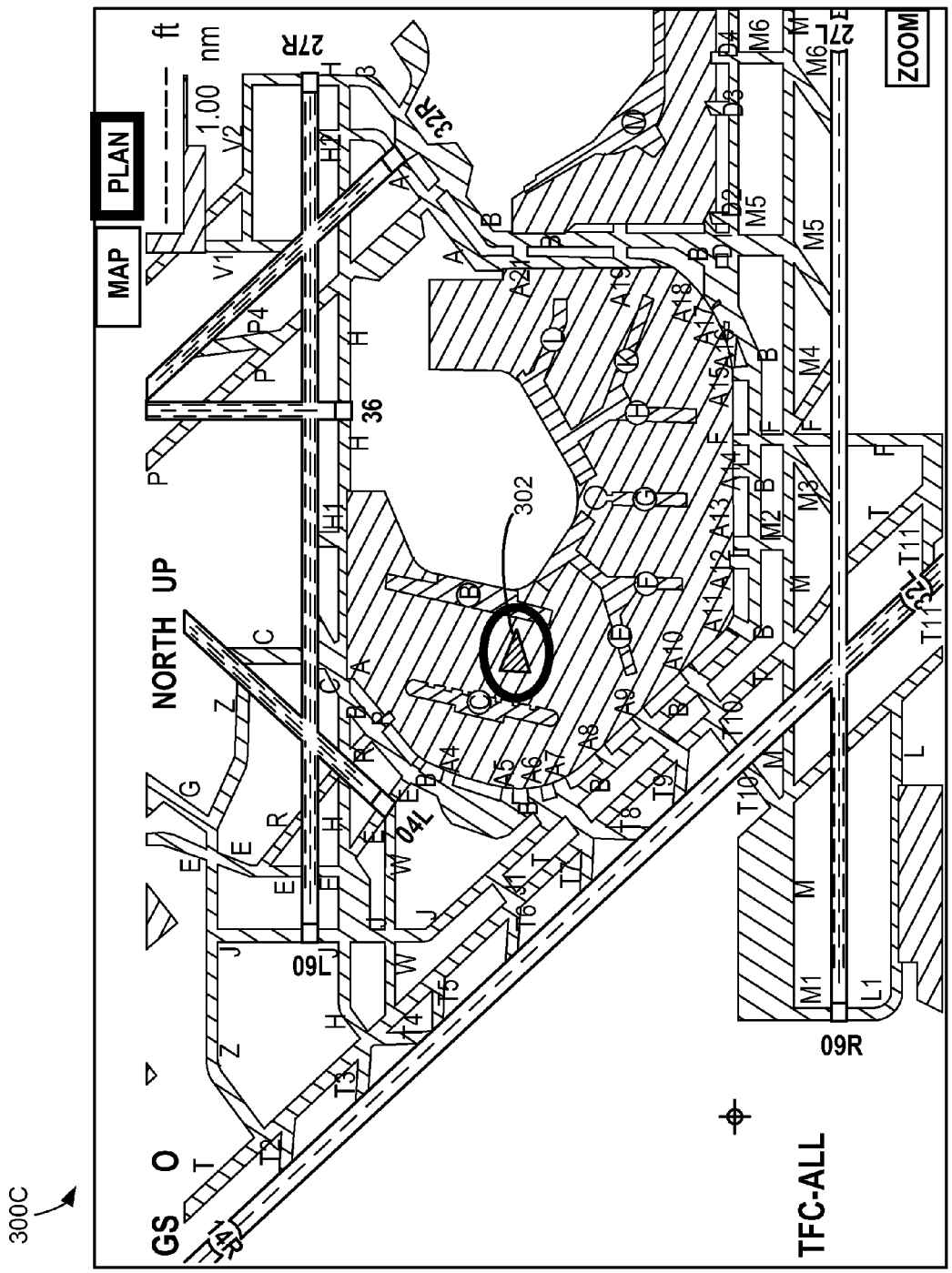
Figure 3D:
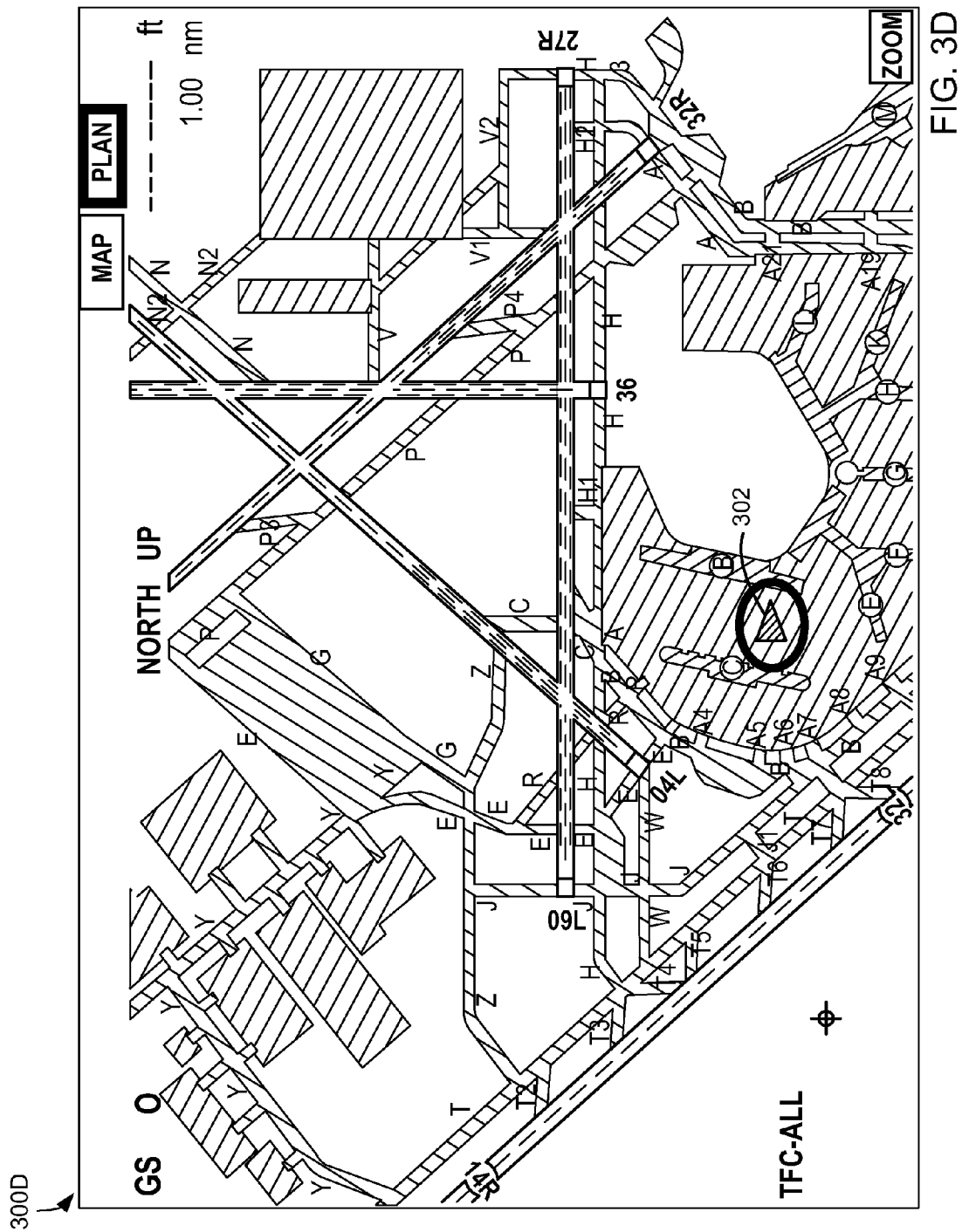

Another example of the north-shift centering strategy is demonstrated in FIGS. 3C and 3D. FIG. 3C shows an aircraft display image 300C where the ownship position indicator 302 is centered on the aircraft display 104 and heading East (towards the right side of the aircraft display). If the center and range retention module 106 implements the north-shift centering strategy, upon the CTR switch 204 being pressed, the aircraft display 104 will display the aircraft display image 300D, which centers on a predefined map location located north of the ownship in the map of the aircraft display image 300C in FIG. 3C.

Another centering strategy is the heading-shift centering strategy. In this strategy, upon pressing the CTR switch 204, the aircraft display 104 centers on a predefined map location aligned with an ownship position indicator heading. The ownship position indicator heading represents the aircraft's direction of heading or track. In this centering strategy, the predefined map location lies ahead of the aircraft in the aircraft's direction of heading or track. This allows a pilot to see what lies ahead of ownship and assists the pilot in planning. The aircraft display image 300A and aircraft display image 300B also show an implementation of the heading-shift centering strategy. This is because the ownship was heading towards the predefined map location that was centered on the aircraft display 104, upon pressing the CTR switch 204. In various embodiments, the heading-shift centering strategy may involve one predefined map location aligned with the ownship position indicator heading, such that the center of the aircraft display may alternate between the ownship position indicator 302 and the predefined map location aligned with the ownship position indicator heading. Alternatively, in embodiments where the heading-shift centering strategy involves more than one predefined map location aligned with the ownship position indicator heading, the center of the aircraft display may cycle through two or more predefined map locations aligned with the ownship position indicator heading before recentering on the ownship position indicator.

Figure 3E:
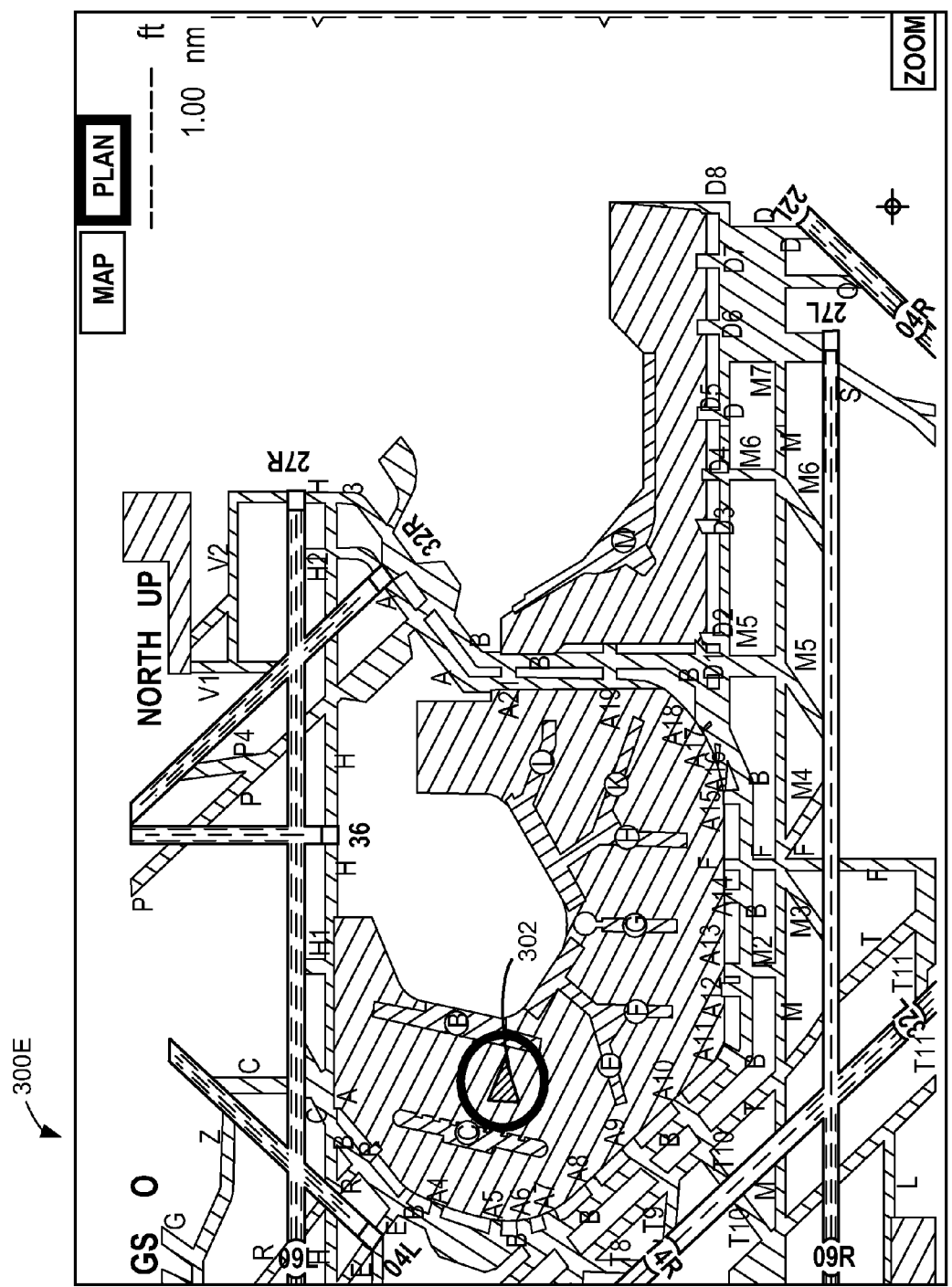

Another example of the heading-shift centering strategy is shown in aircraft display image 300C shown in FIG. 3C and aircraft display image 300E shown in FIG. 3E. The aircraft display image 300C shows that the ownship position indicator 302 is centered on the aircraft display 104 and heading East (towards the right side of the aircraft display). If the center and range retention module 106 implements the heading-shift centering strategy, upon the CTR switch 204 being pressed, the aircraft display 104 will display the aircraft display image 300E, which centers on a predefined map location ahead of ownship in the aircraft display image 300C in FIG. 3C.

Figure 3F:
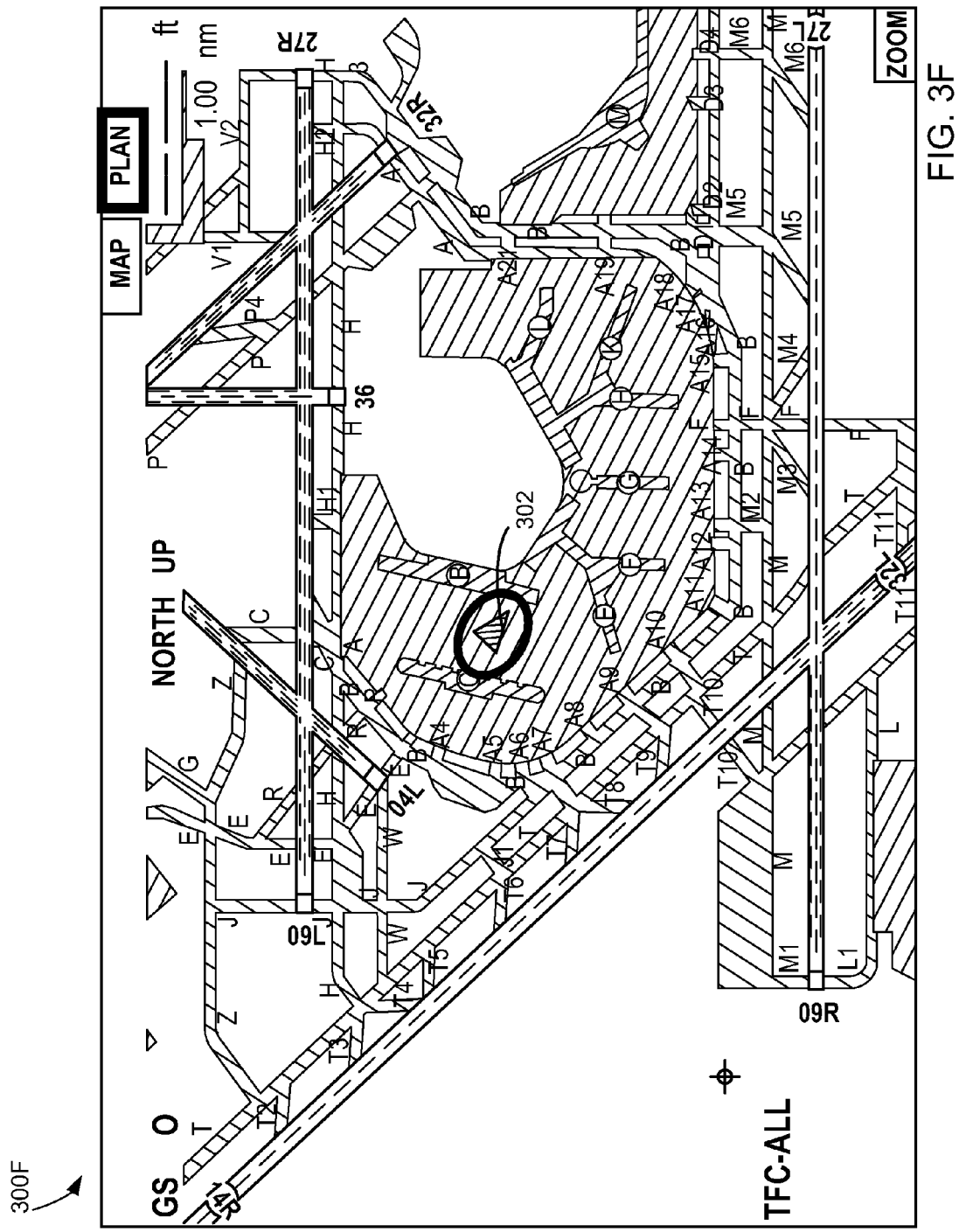
Figure 3G:
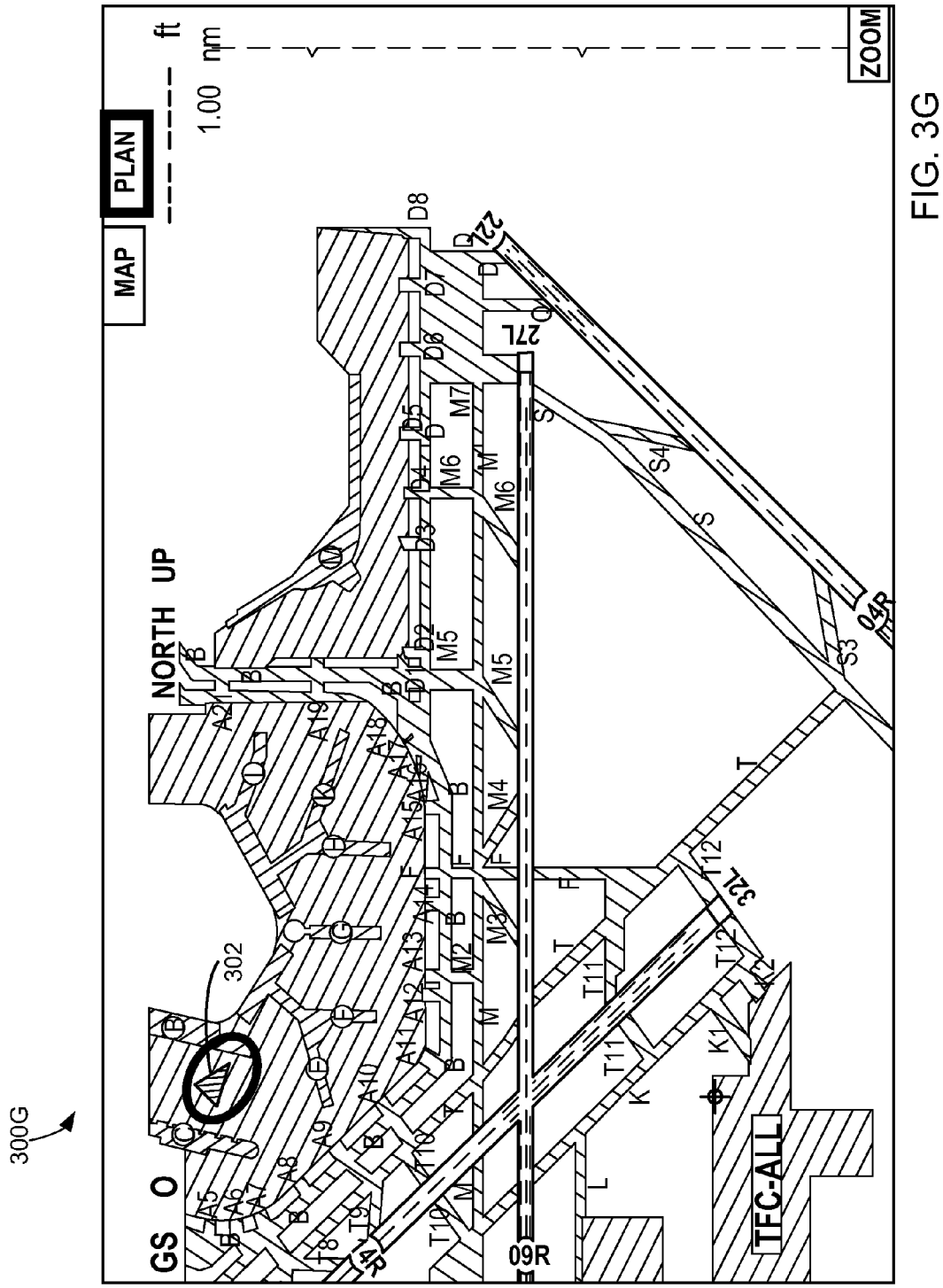

FIGS. 3F and 3G illustrate another example of the implementation of the heading-shift centering strategy by the center and range retention module 106. FIG. 3F shows an aircraft display image 300F, where the ownship position indicator 302 is at the center of the aircraft display 104 and heading towards the bottom right corner of the aircraft display image 300F. FIG. 3G shows an aircraft display image 300G, which centers on a predefined map location in the direction of the ownship heading, which was previously located near the bottom right corner of the aircraft display image 300F. Further, the aircraft display image 300G displays the ownship position indicator 302 towards the top left corner of the aircraft display image 300G.

According to embodiments, upon pushing the CTR switch 204 once, a first predefined map location is centered on the aircraft display 104. Upon subsequent presses of the CTR switch 204, the aircraft display 104 may display another predefined map location at the center of the aircraft display. In various embodiments, each alternate push of the CTR switch 204 may cause the aircraft display 104 to display an aircraft display image, where the ownship position indicator 302 is centered on the aircraft display, as shown in aircraft display images 300A and 300C.

According to various embodiments, upon pressing the CTR switch 204, the aircraft display 104 may center on any predefined map location. Further, in a heading-shift centering strategy, the centering strategy may center on a predefined map location at the edge of the aircraft display 104 or any location that lies ahead of the ownship in the direction of travel.

According to other embodiments, alternative centering strategies may be implemented. In various embodiments, alternative two-state and multistate centering strategies may initially center on the ownship, the origin or destination airport, the origin or destination runway, the nearest or most relevant runway or traffic, or some other relevant display location, feature or information. Further, the alternative centering strategies may be dependent on the mode of the flight. For instance, air/ground, flight phase (taxi, takeoff, climb, enroute, approach/landing) or ownship speed or heading. Alternative centering strategies may also include autoranging to ensure the desired visibility of map elements or information. In addition, alternative centering strategies may involve alternative display modes on the aircraft display 104 such as runway up, ownship heading/track up, traffic heading/track up, etc. It should further be appreciated that an alternative centering strategy may center on any predefined map location that is non-aligned with the ownship position indicator heading, such that the predefined location that is centered on does not lie in the direction of heading or track of the aircraft.

The following is a non-exhaustive list of alternative centering strategies that may be implemented by the center and range retention module 106 according to various embodiments described herein. It should be appreciated that the present disclosure is not limited to the centering strategies recited in this list, but may include other centering strategies that are not recited herein. The list includes alternative centering strategies, wherein the aircraft display 104 initially:

1. centers on the ownship, and upon the push of the CTR switch 204, the aircraft display 104 centers on an entire taxi route, such that the aircraft display 104 shows all segments of the taxi route and centers the displayed information accordingly, 2. centers on the ownship, and upon the push of the CTR switch 204, the aircraft display 104 centers on one of the next taxi route intersection, the next taxi route segment, the next runway intersection, or the next departure or landing runway, 3. centers on the ownship, and upon the push of the CTR switch 204, the aircraft display 104 centers on one of the next aircraft route waypoint, the next aircraft route segment, or the next airway intersection, 4. centers on the current taxi route segment, and upon the push of the CTR switch 204, the aircraft display 104 centers on one of the next taxi route intersection, the next taxi route segment, or the next runway intersection, 5. centers on the next taxi route intersection, and upon the push of the CTR switch 204, the aircraft display 104 centers on one of the following taxi route intersection, the following taxi route segment, or the following runway intersection, 6. centers on the next runway intersection, and upon the push of the CTR switch 204, the aircraft display 104 centers on one of the following runway intersection or the departure runway, 7. centers on the closest relevant runway, and upon the push of the CTR switch 204, the aircraft display 104 centers on a corresponding relevant runway traffic, 8. centers on the closest relevant offscale traffic, and upon the push of the CTR switch 204, the aircraft display 104 centers on a corresponding relevant runway, and 9. centers and ranges out on the closest relevant offscale traffic, and upon the push of the CTR switch 204, the aircraft display 104 centers and ranges in on a corresponding relevant runway.

It should be appreciated by those skilled in the art that a centering strategy may include more than two predefined map locations. For example, in one centering strategy, each subsequent press of the CTR switch 204 causes the aircraft display to center on a different predefined map location at the edge of the aircraft display, such that the aircraft display cycles through nine different aircraft display images which center on the top left corner, the top center, the top right corner, the right center, the bottom right corner, the bottom center, the bottom left corner, and the left center of the aircraft display. Further, other alternative centering strategies may be a combination of the strategies listed above. Additionally, the pilot may be able to create his own centering strategy by selecting predefined locations from a list of selectable locations in the map or the aircraft display.

In one embodiment, the center and range retention module 106 may implement a different centering strategy upon each subsequent press of the CTR switch 204, while another button on the EFIS control panel 200 may be designated for cycling through the various predefined centering locations associated with the implemented centering strategy. In another embodiment, the center and range retention module 106 may be programmed to determine the most suitable centering strategy to implement depending on what phase of the flight the aircraft is in.

The center and range retention module 106 may also be utilized by the pilot for ranging in and out of a map displayed on the aircraft display. In situations where a pilot needs to determine whether the runway is occupied or blocked for landing purposes, the pilot may center on the runway and then choose to range in to see if there are any stationary aircraft on the runway. Therefore, along with utilizing a centering strategy, a pilot may find it desirable to be able to control the range of the aircraft display. By rotating the range selector 214, an aircraft display image on the aircraft display 104 may be ranged in to get a closer view of the surrounding areas of the center of the aircraft display image or may be ranged out to view a larger area around the aircraft display image. It should further be appreciated that the range selector 214 may be used in both the MAP display mode and the PLN display mode, thereby enhancing the pilot's ability to use the PLN display mode for tactical purposes.

Those skilled in the art will appreciate that by using both the MAP display mode and the PLN display mode for tactical purposes, a pilot may choose to switch the aircraft display 104 from the MAP display mode to the PLN display mode and vice versa within short periods of time. According to concepts provided herein, the center and range retention module 106 is configured to retain the last displayed center and range settings for each particular display mode. This allows the pilot to view the MAP display mode or the PLN display mode with their corresponding center and range settings, without having to readjust the center and range settings each time the pilot switches between the MAP display mode and the PLN display mode. In some embodiments, a pilot may choose not to retain the last displayed center and range settings. Therefore, the EFIS control panel 200 may provide the pilot the capability of turning the retention mode on or off via the RTN switch 218, such that when the retention mode is off, the center and range retention module 106 does not retain the last displayed center and range settings for each display mode.

The center and range retention module 106 may store the various centering strategies, the last selected center and range settings for each display mode, amongst other relevant information in a memory. The memory may be a mass storage device on which the center and range retention module is stored on, or some other medium that is accessible by the display management system 102 as described below with respect to FIG. 7.

Referring now to FIGS. 4A-4D, the present disclosure will describe some aircraft display images on the aircraft display that demonstrate the retention capabilities of the center and range retention module 106. Embodiments of the present disclosure will demonstrate how the center and range settings of one display mode may be altered without affecting the center and range settings of another display mode.

Figure 4A:
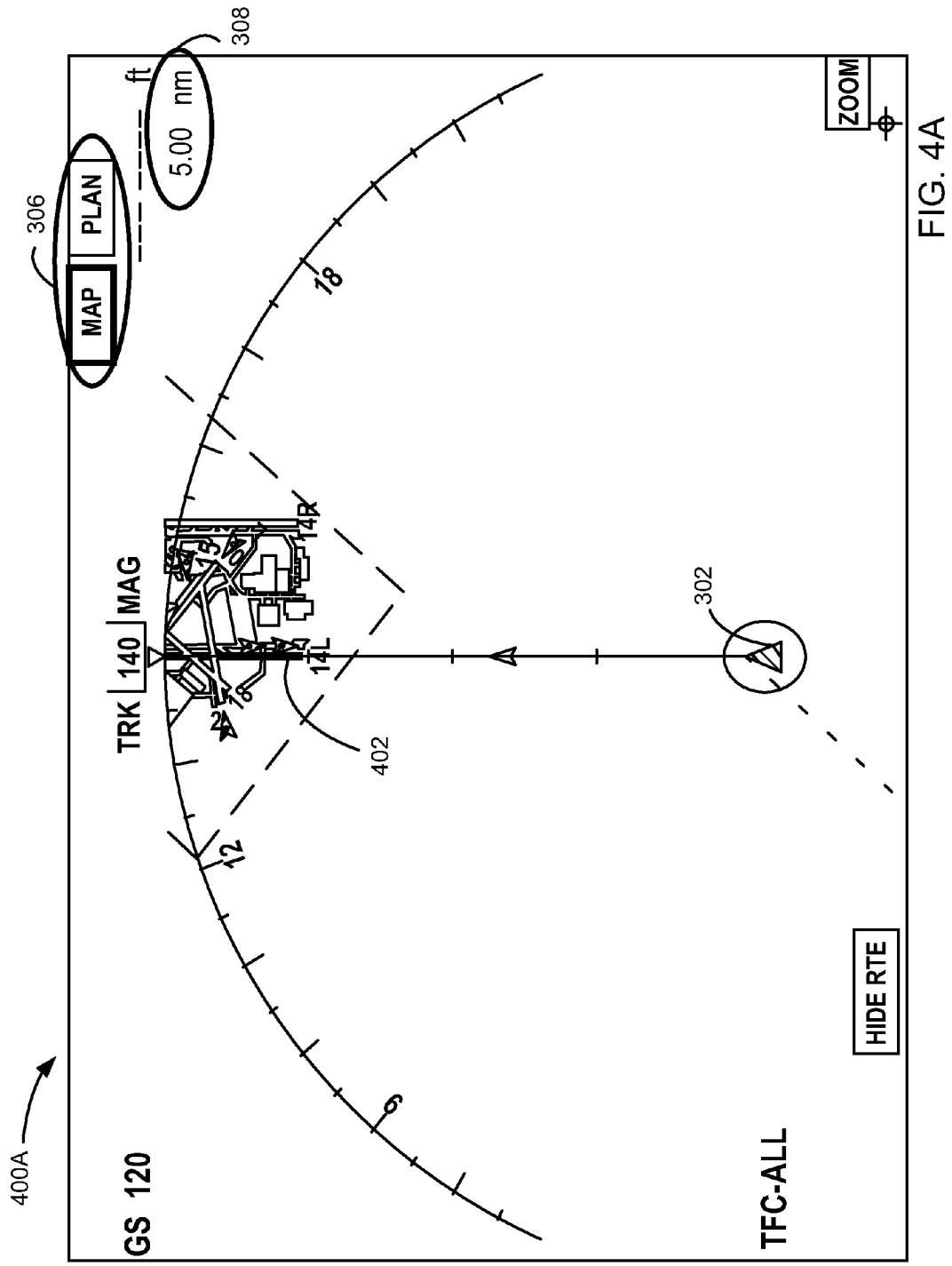
FIGS. 4A-4D are aircraft display images showing the MAP display mode and the PLN display mode of the aircraft display, according to embodiments presented herein.

FIG. 4A shows an aircraft display image 400A that is in the MAP display mode, as indicated by the display mode indicator 306. The current range level is set at 5 nm as indicated by the range indicator 308 near the top right corner of the aircraft display image 400A. The aircraft display image 400A shows a map where the ownship is approaching an airport runway 402 in the MAP display mode.

Figure 4B:
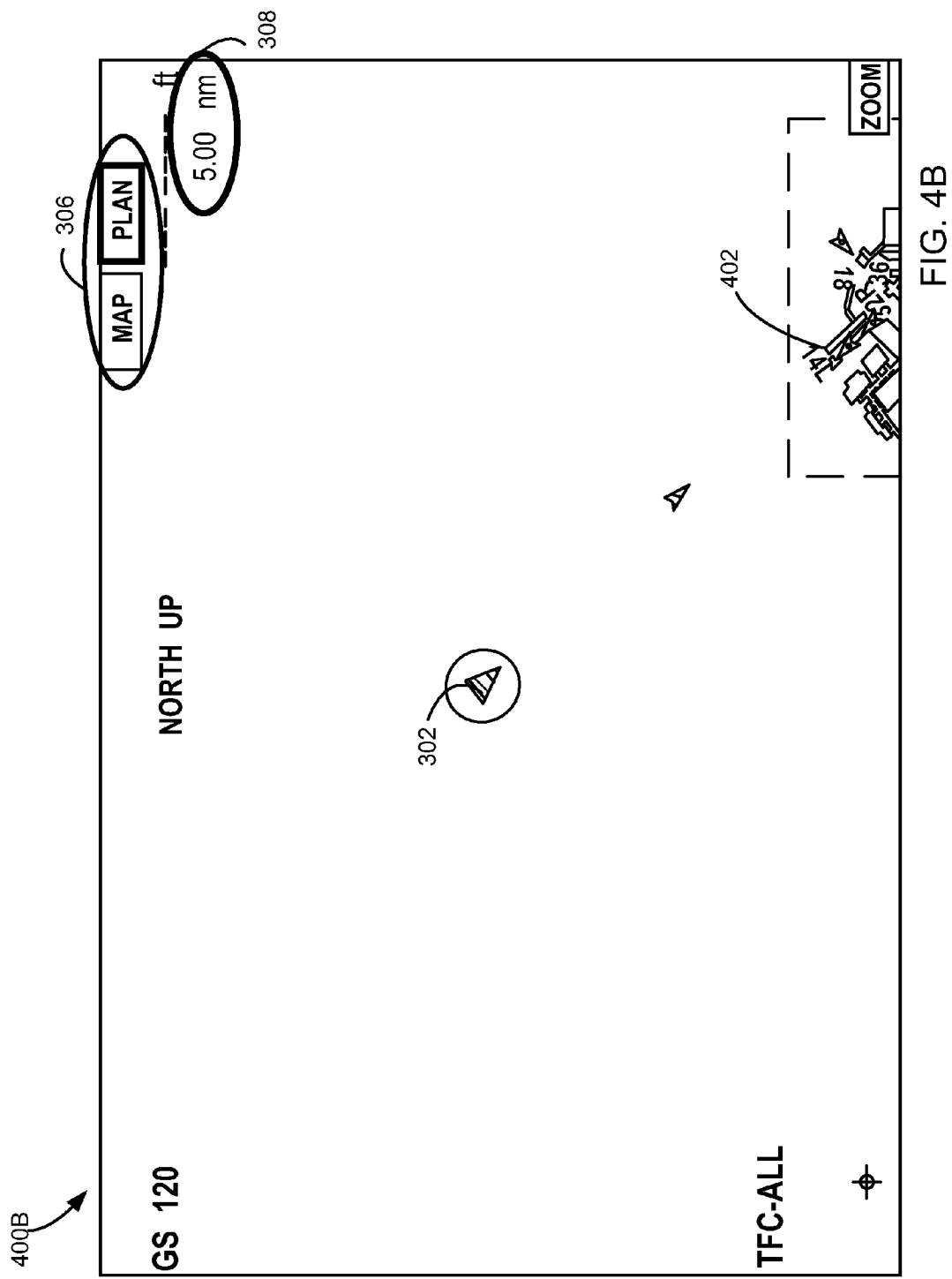
Figure 4C:
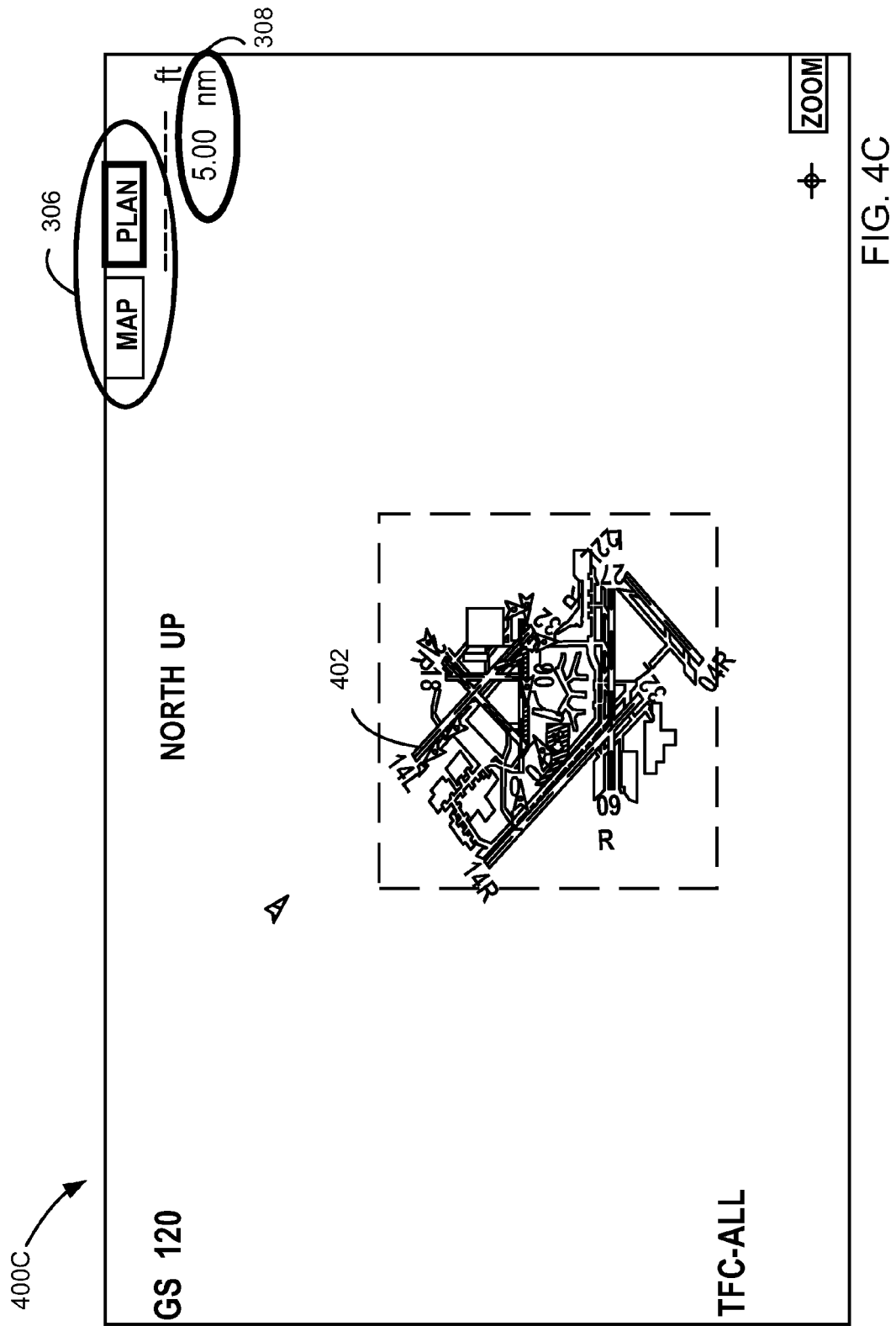

If the pilot desires to view the map on the aircraft display in the PLN display mode, the pilot may rotate the aircraft display mode selector 202 to the PLN position 208 causing the aircraft display to switch from aircraft display image 400A in the MAP display mode to the aircraft display image 400B in the PLN display mode, as shown in FIG. 4B. The aircraft display image 400B is in the PLN display mode, as indicated by the mode indicator 306. The ownship position indicator 302 is currently centered and the ownship is heading in the direction of the airport runway 402, along the diagonals of the aircraft display image 400B. The airport runway 402 may be seen at the southeast corner of the aircraft display image 400B. In addition, the range level is also set at 5 nm, as indicated by the range indicator 308.

The pilot may then decide to center on a predefined map location by pressing the CTR switch 204 on the EFIS control panel 200, causing the aircraft display 104 to show aircraft display image 400C. As can be seen from the aircraft display image 400C, the heading-shift centering strategy is implemented by the center and range retention module 106, causing the aircraft display to display the airport associated with the airport runway 402 on the center of the aircraft display 104. In alternative embodiments, the display centers on the airport or destination runway.

Once the airport has been centered on the aircraft display, the pilot may find it desirable to range in on the airport runway 402 so that the pilot may be able to get a more detailed image of the airport runway 402. To range in, the pilot may rotate the range selector 214 to range in from 5 nm to 2 nm, as indicated by the range indicator 308, located near the top right corner of the aircraft display image 400D.

Upon viewing the airport runway 402 in the PLN display mode at a range setting of 2 nm, the pilot may choose to display the map in the MAP display mode on the aircraft display 104. To do so, the pilot may rotate the aircraft display mode selector 202 from the PLN position 208 to the MAP position 206. According to various embodiments, if the RTN switch 218 is activated on the EFIS control panel 200, the aircraft display 104 displays the aircraft display image 400A as shown in FIG. 4A. The pilot may now utilize the CTR switch 204 to center in on a desired predefined map location and the range selector 214 to range in or out of the center location on the aircraft display image 400A. If the pilot then chooses to view the map in the PLN display mode again by selecting the PLN position 208 via the aircraft display mode selector 202, the aircraft display image 400D will be displayed on the aircraft display 104. This is because the center and range retention module 106 is capable of retaining the last displayed configuration for the MAP display mode and PLN display mode, such that when a particular display mode is deselected and reselected, the last displayed configuration of the last selected predefined map location at the last selected range is displayed on the reselected display mode.

In various embodiments, the retention mode may be turned off by pressing the RTN switch 218 on the EFIS control panel 200. When the pilot turns off the retention mode, the last displayed configuration settings for the MAP display mode are no longer retained, and upon switching from one display mode to another display mode, the current centering location and range level may be transferred from the previous display mode to the selected display mode being displayed on the aircraft display 104. In one embodiment, when the retention mode is deactivated, the display management system 102 may resort to default center and range settings each time the display mode is switched between the MAP display mode and PLN display mode.

Figure 5:
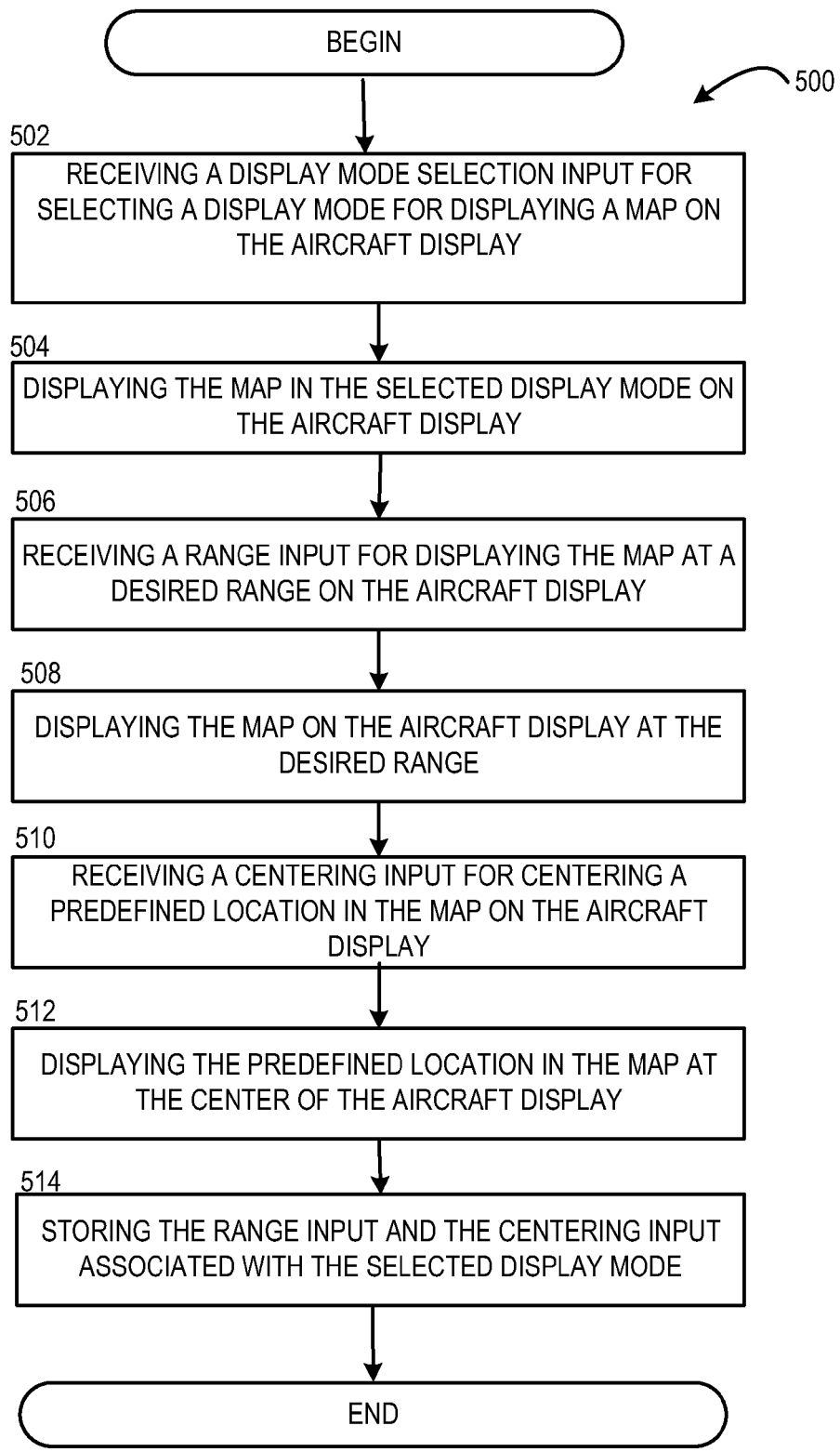
FIG. 5 is a logical flow diagram illustrating a routine for providing enhanced center and range control on an aircraft display, according to embodiments presented herein.
Figure 6:
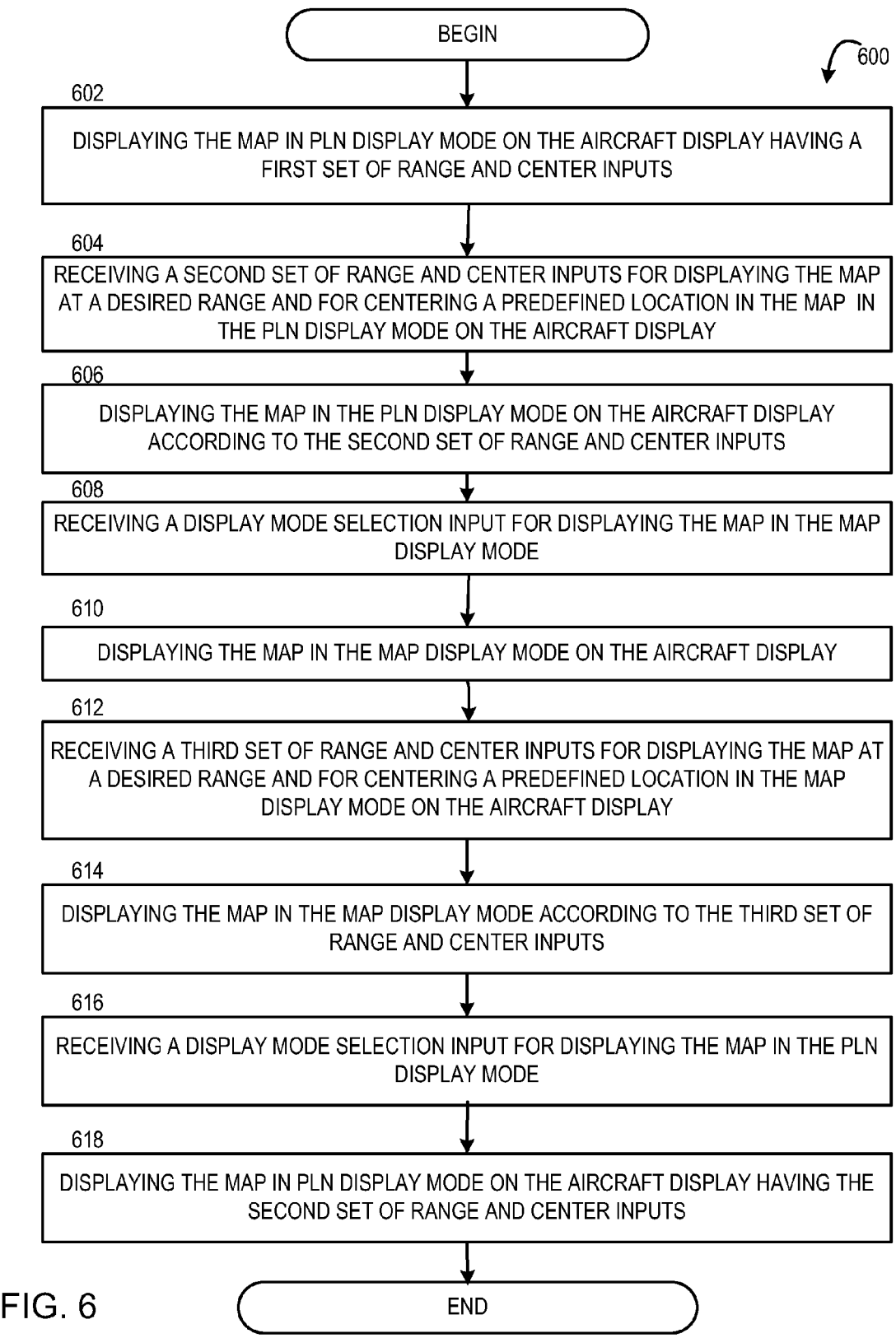
FIG. 6 is a logical flow diagram illustrating a routine for retaining pilot inputs while switching display modes on an aircraft display, according to embodiments presented herein.

FIGS. 5 and 6 are logical flow diagrams illustrating routines for displaying a map in a particular display mode on the aircraft display, according to embodiments described herein. It should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other operating parameters of the computing system. Accordingly, the logical operations described herein are referred to variously as operations, structural devices, acts, or modules. These operations, structural devices, acts and modules may be implemented in software, in firmware, hardware, in special purpose digital logic, and any combination thereof. It should also be appreciated that more or fewer operations may be performed than shown in the figures and described herein. These operations may also be performed in parallel, or in a different order than those described herein.

FIG. 5 is a logical flow diagram illustrating a routine 500 for providing enhanced center and range control on the aircraft display 104. The routine 500 begins at operation 502, where a display mode selection input for selecting a display mode for displaying a map on the aircraft display is received by the display management system 102. The pilot may rotate the aircraft display mode selector 202 located on the EFIS control panel 200 to select the MAP display mode or the PLN display mode for viewing a map on the aircraft display 104. The routine 500 proceeds to operation 504, where the map is displayed in the selected display mode on the aircraft display. For instance, if the pilot selected the PLN display mode, the aircraft display may display aircraft display image 300A, which is in the PLN display mode as indicated by the display mode indicator 306. The routine 500 then proceeds from operation 504 to operation 506, where the pilot may utilize the range selector 214 for ranging in or out of the aircraft display image 300A on the aircraft display 104.

From operation 506, the routine 500 proceeds to operation 508, where the aircraft display 104 then displays an aircraft display image in the PLN display mode at the desired range level, as selected by the pilot. From operation 508, the routine 500 then proceeds to operation 510, where the centering input for centering a predefined map location on the aircraft display 104 is received by the display management system 102. The pilot may press the CTR switch 204 on the EFIS control panel 200 to provide the centering input.

From operation 510, the routine 500 proceeds to operation 512, where a predefined map location selected of a particular centering strategy is centered on the aircraft display 104. From operation 512, the routine 500 proceeds to operation 514, where the range input and the centering input associated with the selected display mode is stored by the display management system 102. It should be appreciated that because the center and range retention module 106 is a part of the display management system 102, the operations described above may be performed by either the center and range retention module or other modules, programs or applications that are a part of the display management system 102.

Figure 4D:
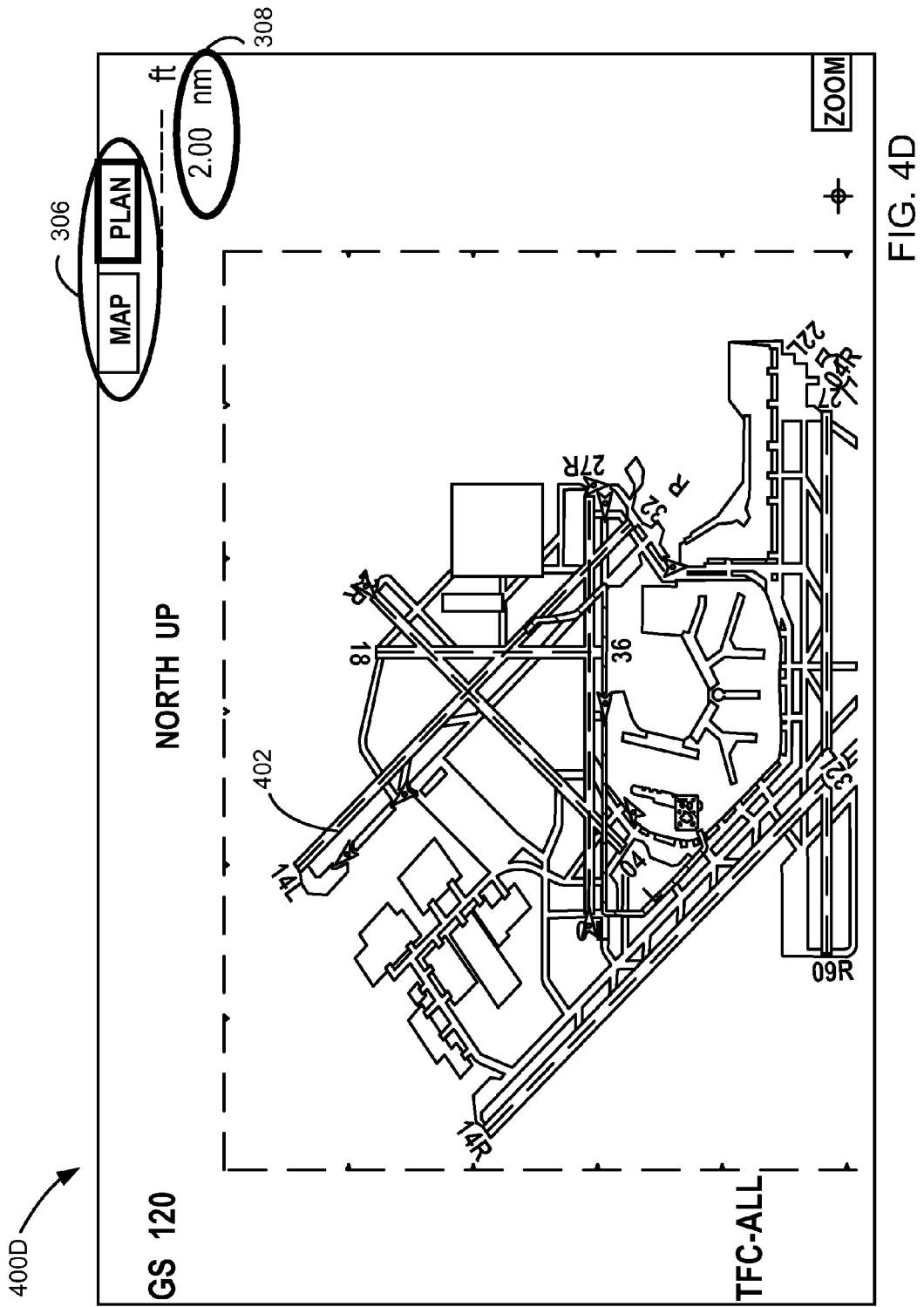

FIG. 6 is a logical flow diagram illustrating a routine 600 for retaining pilot inputs while switching display modes on an aircraft display. The routine 600 begins at operation 602, where the display management system 102 displays a map in the PLN display mode at a range and centered on a predefined map location previously selected by the pilot according to a first set of range and center inputs. The first set of range and center inputs were entered by the pilot on the EFIS control panel 200. For example, the map displayed in the PLN display mode may be the aircraft display image 400B, as shown in FIG. 4B. From operation 602, the routine 600 proceeds to operation 604, where the display management system 102 receives a second set of range and centering inputs for displaying the map in the PLN display mode at a desired range and the selected predefined map location at the center of the aircraft display 104. From operation 604, the routine proceeds to operation 606, where the aircraft display displays the map in the PLN display mode according to the second set of range and centering inputs. Following the example from above, the aircraft display 104 displays aircraft display image 400D, which is in the PLN display mode, as shown in FIG. 4D. In the aircraft display image 400D, the airport runway 402 is centered and the range has been changed from 5.0 nm to 2.0 nm.

From operation 606, the routine 600 proceeds to operation 608, where a display mode selection input for displaying the map in the MAP display mode on the aircraft display is received by the display management system 102. In some embodiments, the aircraft display mode selector 202 located on the EFIS control panel 200 may be rotated from the PLN position 208 to the MAP position 206. From operation 608, the routine 600 proceeds to operation 610, where the aircraft display displays the map in the MAP display mode. From operation 610, the routine 600 proceeds to operation 612, where the display management system 102 receives a third set of range and centering inputs for displaying the map in the MAP display mode at a desired range and the selected predefined map location at the center of the aircraft display 104. The routine then proceeds to operation 614, where the map is displayed in the MAP display mode according to the third set of range and centering inputs.

From operation 614, the routine 600 proceeds to operation 616, where the display management system 102 receives another display mode selection input for displaying the map in the PLN display mode again. Accordingly, the pilot may rotate the aircraft display mode selector 202 from the MAP position 206 to the PLN position 208, such that the display management system 102 receives the pilot's input to switch display modes from the MAP display mode to the PLN display mode. From operation 616, the routine 600 proceeds to operation 618, where the aircraft display 104 displays the map in the PLN display mode with the second set of range and center inputs, which were the last stored settings for the PLN display mode. Following the example from above, the aircraft display 104 displays the aircraft display image 400D again.

FIG. 7 shows an illustrative computer architecture for the display management system 102 capable of executing the software components described herein for providing additional centering and range control on an aircraft display of an aircraft in the manner presented above. The display management system 102 includes a central processing unit 702 (CPU), a system memory 708, including a random access memory 714 (RAM) and a read-only memory 716 (ROM), and a system bus 704 that couples the memory to the CPU 702. The display management system 102 also includes a mass storage device 710 for storing an operating or control system as well as specific application modules or other program modules, such as the center and range retention module 106 along with any information pertaining to the retention capabilities of the center and range retention module 106. In one embodiment, a specific storage location in the mass storage device may store the center and range settings for the last displayed center and range settings for each display mode associated with the center and range retention module 106. Other information that may be stored includes centering strategies and predefined map locations associated with the centering strategies of the center and range retention module 106.

The mass storage device 710 is connected to the CPU 702 through a mass storage controller (not shown) connected to the bus 704. The mass storage device 710 and its associated computer-readable media provide non-volatile storage for the display management system 102. Although the description of computer-readable media contained herein refers to a mass storage device, such as a hard disk or CD-ROM drive, it should be appreciated by those skilled in the art that computer-readable media can be any available computer storage media that can be accessed by the display management system 102.

By way of example, and not limitation, computer-readable media may include volatile and non-volatile, removable and non-removable media implemented in any method or technology for storage of information such as computer-readable instructions, data structures, program modules, or other data. For example, computer-readable media includes, but is not limited to, RAM, ROM, EPROM, EEPROM, flash memory or other solid state memory technology, CD-ROM, digital versatile disks (DVD), HD-DVD, BLU-RAY, or other optical storage, magnetic cassettes, magnetic tape, magnetic disk storage or other magnetic storage devices, or any other medium which can be used to store the desired information and which can be accessed by the display management system 102.

According to various embodiments, the display management system 102 may operate in a networked environment using logical connections to other aircraft systems and remote computers through a network, such as the network 720. The display management system 102 may connect to the network 720 through a network interface unit 706 connected to the bus 704. It should be appreciated that the network interface unit 706 may also be utilized to connect to other types of networks and remote computer systems. The display management system 102 may also include an input-output controller 712 for receiving and processing input from a number of other devices, including the EFIS control panel 200, a keyboard, mouse, electronic stylus, or touchscreen, such as may be present on a connected aircraft display 104, such as a navigation display (ND), control display unit (CDU), electronic flight bag (EFB) or other terminal device in the aircraft. Similarly, the input-output controller 712 may provide output to the aircraft display 104, a printer, or other type of output device.

Based on the foregoing, it should be appreciated that strategies for providing enhanced center and range control on an aircraft system of an aircraft are provided herein. Although the subject matter presented herein has been described in language specific to computer structural features, methodological acts, and computer-readable media, it is to be understood that the invention defined in the appended claims is not necessarily limited to the specific features, acts, or media described herein. Rather, the specific features, acts, and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

What is claimed is:

1. A method for providing enhanced center and range control on an aircraft display, comprising:
   receiving a selection of a display mode from a plurality of display modes to display a map in the selected display mode on the aircraft display;
   receiving at least one of a range input for displaying the map at a desired range on the aircraft display, and a centering input for centering on a predefined map location on the aircraft display;

storing the at least one of the range input and the centering input associated with the selected display mode;

receiving a deselection and reselection of the selected display mode; and in response to the reselection of the selected display mode, providing the map in the selected display mode according to at least one of the stored range input and the centering input associated with the selected display mode.

2. The method of claim 1, wherein receiving a selection of a display mode to display a map on the aircraft display from a plurality of display modes comprises selecting a PLN display mode from the plurality of display modes, wherein the PLN display mode corresponds to a north-up orientation of the map.

3. The method of claim 2, further comprises:

displaying the map on the aircraft display at the desired range in response to receiving the range input; and displaying the predefined map location at the center of the aircraft display in response to receiving the centering input.

4. The method of claim 2, further comprises receiving a subsequent centering input for centering another predefined map location on the aircraft display selected from a plurality of sequentially arranged predefined map locations.

5. The method of claim 4, further comprises:

upon receiving a centering input for centering a predefined map location on the aircraft display, centering on an ownship position indicator indicating a map position of an aircraft, on the aircraft display; and upon receiving the subsequent centering input for centering another predefined map location, centering on a map location that is north of the ownship position indicator on the aircraft display.

6. The method of claim 4, further comprises:

upon receiving a centering input for centering a predefined map location on the aircraft display, centering on an ownship position indicator indicating the map position of an aircraft on the aircraft display; and upon receiving a subsequent centering input for centering another predefined centering location, centering on a map location along ownship heading that is at the edge of the aircraft display on the aircraft display.

7. The method of claim 4, further comprises:

upon receiving a centering input for centering on a predefined map location on the aircraft display, centering on an ownship position indicator indicating a map position of the aircraft, on the aircraft display; and upon receiving a subsequent centering input for centering another predefined map location, centering on one of the departure airport, destination airport, an active runway status indication, an active runway status traffic, a next taxi route segment or a next intersection of taxi route segments on the aircraft display.

8. The method of claim 1, wherein receiving the centering input comprises receiving one of a pilot input, automated logic input and a default programmed input for centering on a desired predefined map location on the selected display mode.

9. The method of claim 1, wherein receiving the range input comprises receiving one of a pilot input, automated logic input and a default programmed input for implementing the desired range on the selected display mode.

10. The method of claim 1, wherein:

receiving the range input comprises receiving the range input via one of a rotary switch, cursor display input, and touch display input associated with the aircraft display; and receiving the centering input comprises receiving the centering input via one of a momentary switch, cursor display input, and touch display input associated with the aircraft display.

11. A system for providing enhanced center and range control on an aircraft display, comprising:

a computer storage medium comprising instructions stored thereon for centering a plurality of map locations on the aircraft display, the plurality of map locations comprising an ownship position indicator map location corresponding to a map location of the aircraft, a map location aligned with an ownship position indicator heading, and a map location non-aligned with the ownship position indicator heading;

a control panel configured to receive a display mode selection input for selecting a display mode for displaying a map on the aircraft display from a MAP display mode and a PLN display mode, wherein the MAP display mode corresponds to a track-up or heading-up orientation of the map and the PLN display mode corresponds to a north-up orientation of the map, and receive a centering input selecting a predefined map location from the plurality of map locations for centering on the selected predefined map location on the aircraft display; and the aircraft display configured to display the map in the selected display mode with the selected predefined map location at a center of the aircraft display.

12. The system of claim 11, wherein the control panel is further configured to receive a range input for displaying the map at a desired range on the aircraft display.

13. The system of claim 12, wherein the aircraft display is further configured to display the map in the selected display mode at the desired range.

14. The system of claim 13, further comprises a memory configured to store the selected centering input and range input associated with the selected display mode such that when the selected display mode is deselected and reselected, the aircraft display redisplays the map in the selected display mode in accordance with the stored centering input and range input.

15. The system of claim 12, wherein the control panel comprises:

a display mode rotary switch configured to receive the display mode selection input;

a centering momentary switch configured to receive the centering input; and a range input rotary switch configured to receive the range input.

16. The system of claim 11, wherein the plurality of display modes comprises at least a PLN display mode and a MAP display mode, wherein the PLN display mode corresponds to a north-up orientation of the map and the MAP display mode corresponds to a track-up or heading-up orientation of the map.

17. The system of claim 11, wherein receiving a centering input selecting the predefined map location from the plurality of map locations comprises receiving a centering input for at least one of centering on a map location that is north of the ownship position indicator on the aircraft display, centering on a location along ownship heading that is at the edge of the aircraft display on the aircraft display, centering on an active runway status indication on the aircraft display, centering on an active runway status traffic on the aircraft display, centering on a next taxi route segment on the aircraft display, and centering on a next intersection of taxi route segments on the aircraft display.

18. A system for providing enhanced center and range control on an aircraft display in an aircraft, comprising:

a control panel comprising a display mode selector switch configured to receive a display mode selection input for displaying a map on the aircraft display in a MAP display mode or a PLN display mode, wherein the MAP display mode corresponds to a track-up or heading-up orientation of the map and the PLN display mode corresponds to a north-up orientation of the map, a centering switch for receiving a centering input selecting a predefined map location from a plurality of predefined map locations for centering the selected predefined map location on the aircraft display, and a range switch for receiving a range input for selecting desired range to display the map on the aircraft display at the desired range;

a display management system operative to receive the display mode selection input, the centering input and the range input, and store the centering input and the range input associated with the selected display mode; and the aircraft display configured to display the map in the selected display mode at the desired range and with the predefined map location at a center of the aircraft display.

19. The system of claim 18, wherein:

the display mode selector switch is a rotary switch;

the centering switch is a pushbutton switch; and the range switch is a rotary switch.

20. The system of claim 18, wherein the control panel further comprises a retention switch configured to activate a retention mode when the retention switch is on and to deactivate a retention mode with the retention switch is off.

* * * * *